(12) United States Patent
Sakharov

(10) Patent No.: US 8,346,088 B2
(45) Date of Patent: Jan. 1, 2013

(54) CONTROLLABLE OPTICAL ADD/DROP MULTIPLEXER

(75) Inventor: Vyacheslav Konstantinovich Sakharov, Moscow (RU)

(73) Assignees: Federal State Institution "FederalAgency for Legal Protection of the Results of Intellectual Activity with Military, Special and Dual Purposes" at the Ministry of Justice of Russian Federation, Moscow (RU); Vospi Center CISC (Closed Stock Company), Moscow (RU)

( * ) Notice: Subject to any disclaimer, the term of this patent is extended or adjusted under 35 U.S.C. 154(b) by 1218 days.

(21) Appl. No.: 12/085,814

(22) PCT Filed: Nov. 29, 2005

(86) PCT No.: PCT/RU2005/000610
§ 371 (c)(1),
(2), (4) Date: May 29, 2008

(87) PCT Pub. No.: WO2007/064241
PCT Pub. Date: Jun. 7, 2007

(65) Prior Publication Data
US 2009/0110401 A1    Apr. 30, 2009

(51) Int. Cl.
*H04J 14/02* (2006.01)
(52) U.S. Cl. ............... 398/83; 398/79; 398/85
(58) Field of Classification Search ........ 398/45, 398/49–51, 68, 79, 83–85
See application file for complete search history.

(56) References Cited

U.S. PATENT DOCUMENTS

| | | | |
|---|---|---|---|
| 5,566,014 A * | 10/1996 | Glance | 398/83 |
| 6,602,000 B1 | 8/2003 | Madsen | |
| 2002/0186434 A1 * | 12/2002 | Roorda et al. | 359/128 |
| 2003/0053747 A1 * | 3/2003 | Cormack | 385/24 |
| 2003/0123129 A1 * | 7/2003 | Nakazawa et al. | 359/308 |

FOREIGN PATENT DOCUMENTS

| | | |
|---|---|---|
| RU | 2106065 | 2/1998 |
| RU | 98112177 | 4/2000 |

* cited by examiner

*Primary Examiner* — Dzung Tran
(74) *Attorney, Agent, or Firm* — James Creighton Wray

(57) ABSTRACT

The inventions relate to a method for operating a controllable selective optical add/drop channel for fiber-optic communication system provided with $2^N$ of wavelength-division multiplexing channels, whose optical frequencies are retunable at a constant frequency separations $\Delta v$ between adjacent channels, with the aid of the inventive controllable optical add/drop multiplexers (70, 80, 90) that comprise multi-stage structures of optical filters ({75-*i*}, {85-*i*}, {95-*i*}), that are connected in different manner and provided with devices, for example electro-optical and thermo-optical phase shift devices, for controllable tuning the transmissions characteristics thereof. The optical filters are embodied in the form of single-stage (20), two-stage (40) and/or multi-stage (60) asymmetric Mach-Zehnder interferometers. The controllable optical add/drop multiplexer can be produced according to integrated optic technique in the form of monolithic solid-state device.

7 Claims, 7 Drawing Sheets

CONTROLLABLE OPTICAL ADD/DROP MULTIPLEXER

This application claims the benefit of PCT/RU2005/000610 filed Nov. 29, 2005, which is hereby incorporated by reference in its entirety.

FIELD OF THE INVENTION

The present invention relates to fiber-optic communication systems employing wavelength division multiplexing, particularly to methods of controllable adding or/and dropping communication channels, to controllable and reconfigured optical add/drop multiplexers (t-OADM and ROADM respectively) and may be used as in systems of dense wavelength division multiplexing, so in the systems of coarse wavelength division multiplexing.

BACKGROUND OF THE INVENTION

At the present time wavelength division multiplexing technologies are used to increase transmission capacity of fiber-optic communication systems. There are two main fields of WDM application—dense wavelength division multiplexing (DWDM) and coarse wavelength division multiplexing (CWDM). DWDM technologies are mainly used in long-haul telecommunication systems and CWDM technologies are used in metro and access networks.

The DWDM is a high-capacity optical-transport technology, but its price is rather high. An international standard wavelength grid, suggested by the International Telecommunication Union (ITU), provides the following frequency separations: 200, 100, 50 or 25 GHz (wavelength spacing of 1.6, 0.8, 0.4, and 0.2 nm respectively); systems with higher wavelength division (12.5 GHz) are already used. For CWDW systems, the number of wavelengths that can be transported on a single fiber is less than that for DWDM systems, the channel spacing, recommended by ITU, is 20 nm. CWDW technologies are simple to use and low-cost.

In nodal points of fiber-optic communication systems for adding/dropping communication channels, optical add/drop multiplexers (OADM) are usually used. They make it possible to drop one or several channels from the line and at the same time to add the signal at the same wavelengths with new information. This provides a significant increase of effective use of communication systems. OADM with fixed channel frequencies are limited in their ability to drop wavelength and add one to the networks by nature of the fixed-wavelength transmitters deployed. Systematically growing demands for increased capacity of communication systems and the use of new approaches require greater flexibility than fixed (static) add/drop devices provide, complicating network operation and planning.

Use of dynamically reconfigured and tuned optical add/drop multiplexers (ROADM or t-OADM respectively) removes this constraint by allowing any channel to be dropped/added at any time, providing optimal routing in hubs along the networks. Besides, t-OADM may also be used in wavelength division systems, where wavelengths may change.

Construction ROADM, well-known to specialists in the sphere of optical systems, is assembled from discrete components including demultiplexers, switches and multiplexers. Typical multiplexers and demultiplexers include multilevel structures on thin filters, diffraction gratings in free space optics or arrayed waveguide gratings for guided wave optics (AWG). Optical switches, used for dropping, adding and passing channels, are, as a rule, microelectricmechanical systems (MEMS). The difficulty with this conventional approach is that it is needlessly expensive, especially if the number of channels in the system is high. It is characterized by significant input losses and degradation of optical signal quality. Besides that, optical switches are susceptible to environmental effects, such as temperature changes and vibration.

The main functional element of t-OADM is a tunable filter—a wavelength selective optical component in which the central wavelength of the selected bandpass can be tuned dynamically. There are many tunable optical filters, but most of them, for various reasons cannot be used successfully in t-OADM. For instance, tunable filters based on acoustic-optical effect are polarization dependent, which causes many practical problems. The Bragg filter is tuned mechanically or by a resistive heater, and tuning speed is therefore comparatively slow—typically of the order of millisecond. Tunable filters based on Fabry-Perot interferometers are also largely unacceptable, since it is not feasible to achieve the necessary degree of fineness in these filters; if they can tune the WDM range, they do not have narrow enough channels, and if they have narrow enough channels, they can only tune a portion of required band.

The tunable filter based on asymmetric or unbalanced/nonsymmetrical Mach-Zehnder interferometer (further, single-stage MZI), is characterized by a low signal insertion loss, low polarization dependence, relatively low cost. Equipped with electro-optic phase shifter, it can provide extremely fast tuning. It is known to those skilled in the art that multi-stage structure on the base of asymmetric single-stage MZI with 8 or 9 stages is characterized by a high selectivity and is sufficient to cover the entire WDM band. That is why among all tuneable filters, specified above, this tunable filter is a more attractive choice for application in t-OADM and ROADM.

There is a controllable add/drop optical multiplexer (U.S. Pat. No. 6,795,654, B2), that includes an input port, a drop port, an output port, and an add port and includes means for providing an input signal consisting of channels to the input port, a plurality of filter stages connected to the input port, each filter stage operating to selectively transmit either even or odd channels and reflect either odd or even channels respectively, means for providing reflected channels as a pass signal at the output port, and means for providing a transmitted channel at the drop port. Each filter stage could comprise a fiber unbalanced MZI having a selective delay for transmitting the selected channels and a mirror for reflecting channels not transmitted by the fiber unbalanced MZI. The means for providing reflected channels as a pass signal at the output port and the means for providing an add signal at the add port, such that the add signal follows the reverse path of the drop signal, could comprise circulators.

Use of this tunable multiplexer provides realization of the method of selectively passing and dropping channels from an input signal (U.S. Pat. No. 6,795,654, B2), the method comprising the steps of: selectively transmitting either even or odd channels and reflecting either odd or even channels respectively; this operation is repeated as many times, as it may be necessary to reflect all the channels, except the desired channel; providing a transmitted channel as the drop signal at the drop port and combining of reflected channels at the drop port, providing an add signal at the add port and combining the add signal and the pass signals.

The scheme of one of embodiments of such multiplexer—device 10—is shown on FIG. 1. Multiplexer 10 has an input port 11, an output pass+add port 12, an output drop port 13, an add port 14 and includes three one-stage MZIs: 15-1, 15-2 and 15-3, formed with the help of three coupler pairs {16-1, 16-2}, {16-3, 16-4} and {16-5, 16-6} and, as interferometer arms, connecting optical fibers {17-1,17-2}, {17-3,17-4} and {17-5,17-6}. The difference in optical path of arms in three interferometers increases in two times during transfer to the next interferometer.

Each of three specified single-stage MZI 15-1, 15-2 and 15-3 transmits the selected channels and with the help of fiber-optical mirrors 15-1-1, 15-2-1 and 15-3-1 reflects and returns back even or odd channels respectively. Two signal routing components are used: circulator 18-1, connected with add 11 and pass 12 ports, meant for providing an input signal consisting of channel to the input port 11 и for providing reflected channels as a pass signal at the output pass+add port 12, and circulator 18-2—for transmitting of channel at the output drop port 13 and for providing an add signal at the add port 14 such that the add signal follows the reverse path of the drop signal.

The three-stage structure provides drop of one channel during add of 8 channels at the add port and add of the new channel in spite of dropped one. Tunable phase shifters 15-1-2, 15-2-2 and 15-3-2, installed in one of the arms of every of three interferometers 15-1, 15-2 and 15-3 respectively, are used for controllable tuning of spectral characteristics of the specified one-stage MZIs 15-1, 15-2 and 15-3 and in that way for add/drop of any of eight channels.

According to the patent (U.S. Pat. No. 6,795,654, B2), other proposed variants propose to make single-stage MZI with the help of discrete elements: splitters, mirror-prisms, polarizer and modernized Layot filters. As an alternative to mirrors 15-1-1, 15-2-1 and 15-3-1 and circulators 18-1 and 18-2 it is possible to use an additional structure of optical filters on single-stage MZI for transmitting of channels to output add/pass port 12.

The device specified above provides add and drop any of eight channels of an optical network. However, the device suffers from several essential downsides.

It is known to specialists in the sphere of optical networks that structure, described above, contains a lot of optical elements—one-stage MZI in fiber or discrete versions, mirrors and circulators, and is rather large-dimensioned and cannot be reliable and stable in real conditions, because one-stage MZI is very susceptible to environmental effects, such as temperature changes, vibrations and other factors. That is why the realization of such devices requires another approach, using integral-optical technologies. It is also known that one-stage MZIs transmissions are characterized by the non-flatness in the passband and also the narrowness of the stopband, which may cause a crosstalk and low isolation between adjacent channels. Besides that, one-stage MZIs cause undesirable large dispersion into a filtered channel, that during rapid transmission causes pulse widening data signal and so a decrease in the transmission capability of the optical network.

It is known that two-stage unbalanced MZIs or multi-stage unbalanced MZIs (further two-stage and multi-stage MZIs) have significantly better spectral characteristics and lower dispersion, but these devices are not bidirectional and so cannot be used in add/drop multiplexer 10, described above.

To provide possibility of integral-optical construction of controllable optical add/drop multiplexer, it is necessary to reduce the amount of optical elements used and eliminate circulators and mirrors, because they are not compatible with integral-optical technology. Reduction of the amount of optical elements used is also rational from a financial point of view (the price of the device will be cheaper).

Therefore the creation of methods of a controllable add/drop and of a controllable optical add/drop multiplexer that is less engineered and meets present requirements concerning channel insulation and dispersion, and may be executed in an integral-optical version, is urgently needed. It is desirable for such a device to have additional functional opportunities, to be maximally dynamic and flexible enough, i.e. to provide the best ratio of technical characteristics to price for various applications.

SUMMARY OF THE INVENTION

The present invention is directed to the provision method and devices for dropping and adding a user-chosen wavelength channel from multi-channel optical signal with the help of selection of channel by control of spectral characteristics of filtering stages of the optical add/drop multiplexer; and to provide further drop of desired channel, transmission of undesired channels, add of new signal.

Then, in the present invention, there is provided a method of a controllable selective add/drop channel in a fiber-optic communication system provided with $2^N$ of wavelength-division multiplexing channels, optical frequencies of which at a constant frequency separation $\Delta v$ between adjacent two channels are retunable, the method comprising:

(a) inputting multi-channel optical signal in a N-stage structure, where each stage, at n=1, 2, . . . , N, contains an optical filter having one input or two inputs and two outputs and is characterized by transmission in form periodic function with spectral separation between two adjacent extremums $\Delta v = 2^{n-1} \Delta v$ and capable of controllable tuning transmissions and to be connected, optical filter in each stage except the first one, by input or one the two inputs with one of the outputs of optical filter of the previous stage, with one input of optical filter of the first stage being an input port of N-stage structure;

(b) choosing channel that is the subject of add/drop;

(c) tuning said optical filter of each stage in such a way that transmission from input to output, that are used in the connection of said optical filters described in (a), had maximal value on the frequency of said chosen channel;

(d) transmitting the multi-channel optical signal through N-stage structure and dropping chosen channel on output of the said optical filter of the last stage, which is a drop port in N-stage structure; and (e) adding of a new channel on the frequency of the drop channel, multiplexing new channel and all channels, except the dropped one, and returning multiplexed channels to the optical network.

In compliance with the invention, it would be rational in the case of optical filters with two inputs: to add a new channel through add port of N-stage structure, connected with input of optical filter of the last stage that is not used in connections of optical filters, described in (a); to combine new channel with all channels except the dropped channel by connection of output of optical filter of each stage, except the first stage, that is not used in connections of optical filters, described in (a), with input of optical filter of the previous stage that is not used in connections of optical filters, described in (a); to return the combined channels to optical network through output of optical filter of the first stage that is not used in connections of optical filters, described in (a).

Besides that, in compliance with the invention, it would be rational during use of optical filters with one input: to add a new channel through one of inputs of optical summation unit with N+1 inputs and one output; to combine new channel with all channels except the dropped channel by connection of output of optical filter of each stage that is not used in connections of optical filters, described in (a), with one of inputs of the specified summation unit, during this combined channels are returned to optical network through output of the summation unit.

The task was accomplished by developing a controllable optical add/drop multiplexer provided with $2^N$ of wavelength-division multiplexing channels, optical frequencies of which at a constant frequency separation $\Delta v$ between adjacent two channels are retunable, that has one input port, one output port, one drop port and one add port, comprising:

a N-stage structure, where each stage, at n=1, 2, ..., N, contains an optical filter having two inputs (a,b) and two outputs (c,d) and characterizing by transmission in form periodic function with spectral separation between two adjacent extremums $\Delta v_n = 2^{n-1} \Delta v$ and capable of controllable tuning transmissions; and a controller (78) for tuning of transmission of said optical filters.

In compliance with the invention, the following would be rational for the add/drop multiplexer in the specified N-stage structure:

optical filter of each stage, except the first one, by one of the inputs and one of the outputs is connected with one of the outputs and one of inputs of optical filter of the previous stage correspondingly;

optical filter of the first stage by the other input is connected with the input port;

optical filter of the first stage by the other output is connected with the output port;

optical filter of the last stage by the other output is connected with the drop port; and optical filter of the last stage by the other input is connected with the add port.

In compliance with the invention, the following would be rational for add/drop multiplexer: optical filters of stages of N-stage structure are one-stage or two-stage asymmetric Mach-Zehnder interferometers.

The task was accomplished by developing a controllable optical add/drop multiplexer for fiber-optic communication system provided with $2^N$ of wavelength-division multiplexing channels, optical frequencies of which at a constant frequency separation $\Delta v$ between adjacent two channels are retunable, that have one input port (81), one output port (82), one drop port (83) and one add port (84), comprising:

a N-stage structure, where each stage, at n=1, 2, ..., N, contains an optical filter having one input and two outputs and characterizing by transmission in form periodic function with spectral separation between two adjacent extremums $\Delta v_n = 2^{n-1} \Delta v$ and capable of controllable tuning transmissions;

optical summation unit (optical combiner) that has N+1 inputs and one output, connected with output port; and a controller for tuning of transmission of the optical filters.

In compliance with the invention, the following would be rational for add/drop multiplexer in the specified N-stage structure:

optical filter of each stage, except the last stage, is connected by one of the outputs with input of optical filter of the next stage, and by other output with one of the inputs of optical combiner;

optical filter of the first stage is connected by input with input port;

optical filter of the next stage is connected by one output with another input of optical combiner, and by other output with drop port; and optical combiner is connected by another input with add port.

In compliance with the invention, the following would be rational for add/drop multiplexer: optical filters of stages of N-stage structure are multi-stage asymmetric Mach-Zehnder interferometers.

The task was accomplished by developing a controllable optical add/drop multiplexer for fiber-optic communication system provided with $2^N$ of wavelength-division multiplexing channels, whose optical frequencies at a constant frequency separation $\Delta v$ between two adjacent channels are retunable, that have one input port (91), one output port (92), one drop port (93) and one add port (94), comprising:

connected between each other the first and the second multi-stage structures having in the first structure has $N_1$ stages and in the second structure has $N_2$ stages, $N_1 + N_2 = N$, and characterizing by transmission in form periodic function and capable of controllable tuning transmissions;

an optical combiner, that has Ni+1 inputs and one output; and a controller for tuning of transmission of said optical filters of the first and second multi stage structures.

In compliance with the invention, the following would be rational for add/drop multiplexer:

an optical filter in the first multistage structure has one input and two outputs and is characterized in n1-stage at n1=1, 2, ..., N1 by spectral separation between two adjacent extremums $\Delta v_{n1} = 2^{n1-1} \Delta v$; and an optical filter in the second multi-stage structure has two inputs and two outputs and is characterized in $n_2$ stage at $n_2$=1, 2, ..., $N_2$ by spectral separation between two adjacent extremums $\Delta v_{n2} = 2^{n2+N1-1} \Delta v$.

In compliance with the invention, the following would be rational for add/drop multiplexer:

in the first multi-stage structure optical filter of each stage, except the last stage, is connected by one output with input of optical filter of the next stage, and by other output with one of the inputs of optical combiner;

in the first multi-stage structure optical filter of the last stage is connected by one output with one of the inputs of optical summation unit, and by the other output with one of the inputs of optical filter of the first stage of second multi-stage structure;

in the second multi-stage structure optical filter of each stage, except first stage, is connected by one of the inputs and by one of the outputs with one of the outputs and one of the inputs of optical filter of the previous stage;

in the second multi-stage structure optical filter of the first stage is connected by another output with another input of optical combiner;

in the first multi-stage structure optical filter of the first stage is connected by another input with the input port;

in the second multi-stage structure optical filter of the last stage is connected by one of the outputs with the output port;

in the second multi-stage structure optical filter of the last stage is connected by other input with the input port; and optical summation unit is connected by output with the output port.

In compliance with the invention, the following would be rational for the add/drop multiplexer: optical filters of the first multi-stage structure are multi-stage asymmetric Mach-Zehnder interferometers; optical filters of the second multi-stage structure are one-stage and/or two-stage asymmetric Mach-Zehnder interferometers.

In compliance with the invention, the following would be rational for controllable tuning the transmission of the said optical filters: optical filters must contain electric-optical or thermal-optical phase shifters.

In compliance with the invention, the following would be rational for add/drop multiplexer: they must be made according to integral-optical technology at one chip.

In compliance with the invention, the following would be rational for add/drop multiplexer: input port, output port, drop port and add port must be made with the help of fiber optics.

So, problem of designing a controllable optical add/drop multiplexer (t-OADM) is solved by this invention, where multi-stage structure of optical filters is used. As optical filters may be used one-stage, two-stage and multi-stage MZI that contain phase shifters and one or two input ports and no less than two output ports.

In method of controllable selective add/drop of one channel from multi-channel optical signal in compliance with this invention, and in all versions of the controllable optical add/drop multiplexer optical filter of each stage, except filter of the first stage, is connected by one of the inputs and one of the outputs with one of the outputs and one of the inputs of optical filter of the previous stage.

During transmitting of multi-channel optical signal through all multi-stage structure in each of the filters the channels are divided into two groups: one group contains even channels, other group contains odd channels, in one of these groups there is a channel, subject to add/drop. Spectral characteristics of optical filters are adjusted so, that in group, transferred to the next stage, always presents the selected channel; as a result only one channel comes to output of filter of the last stage—the selected channel of add/drop. Other channels, together with new added channel, are combined and transmitted to the output port.

In compliance with this invention, where optical filters with two inputs and two outputs may be used, in one of t-OADM versions combining of new channel and all channels, except the dropped one, is executed by connecting of other output of optical filter of each stage, except the first stage, with other input that was not used before of optical filter of the previous system; return of combined channels to optical network is realized through the other output that was not used before of optical filter of the first stage.

In compliance with this invention, where optical filters with one input and two outputs may be used, in other of t-OADM versions combining of add channel and transmitted channels is executed with the help of the optical summation unit, which inputs are connected with second outputs of all filters and with the add port.

In compliance with this invention, in the third variant of controllable optical add/drop multiplexer may be used optical filters with one input and two outputs and optical filters with two inputs and two outputs; the multiplexer is made of two multi-stage structures, one of which is corresponds to the first variant of t-OADM and other corresponds to the second variant of t-OADM. Combining of transmitted channels in each of two structures is executed analogous to combining, used in the first two variants of device; add of new channel is executed in the same manner as in the first variant.

In compliance with the invention, one-stage or two-stage asymmetric Mach-Zender interferometers are used as optical filters with two inputs and two outputs; multi-stage asymmetric Mach-Zender interferometers are used as optical filters with one input and two outputs; electric-optical or thermal-optical phase shifters are used for regulation of transmission factors.

Besides that, it is very important to make the specified multiplexers according to integral-optical technology at one chip.

BRIEF DESCRIPTION OF DRAWINGS

Further the invention is explained by description of examples of method of controllable selective add/drop of channel in fiber-optical communication system with wavelength division multiplexing of $2^N$ channels, which optical frequencies may tune, but spectral interval $\Delta v$ between adjacent channels remains constant, with the help of controllable optical add/drop multiplexers and attached drawing, where the following is shown:

FIG. 2b—is a block diagram of the unbalanced single-stage MZI, shown on FIG. 2a;

FIG. 3—transmission of an unbalanced single-stage MZI, shown on FIG. 2a;

FIG. 4b—is a block diagram of the unbalanced two-stage MZI, shown on FIG. 4a;

FIG. 5—transmission of an unbalanced two-stage MZI, shown on FIG. 4a;

FIG. 6b—is a block diagram of multi-stage filter, shown on FIG. 6a;

DETAILED DESCRIPTION OF PREFERRED EMBODIMENTS

In compliance with the invention, main element of controllable optical add/drop multiplexer is known and widely used in optics device—asymmetric Mach-Zender interferometer, or so called one-stage MZI (M. Born, E. Wolf. "Principles of Optics", Pergamon Press, Oxford, Fifth Edition, 1975, pp. 312-316). One-stage MZI is an interferometer with two parallel single-mode arms running between a pair of coupling stages. Term "asymmetric" means that arm lengths of MZI are not equal. Differences in length, temperature and other parameters of interferometer arms cause a phase shift that can cause constructive or destructive interference.

Variants of MZI, made with the help of fiber-optical couplers, beam splitters, mirror-prisms, polarizers and other elements are discussed above during description of controllable optical add/drop multiplexer (U.S. Pat. No. 6,795,654, B2).

Figure 2A:
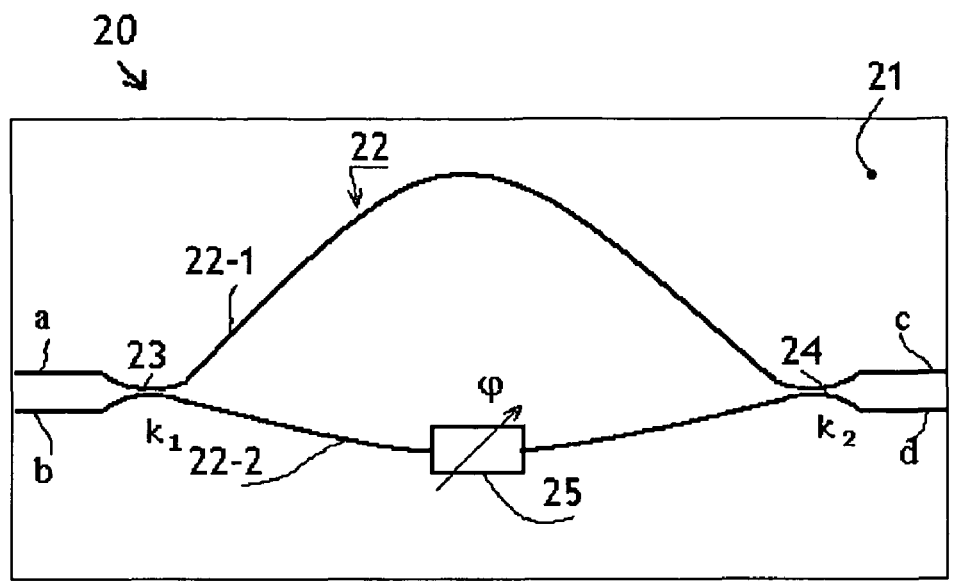
FIG. 2a—is a scheme of a waveguide unbalanced single-stage Mach-Zehnder interferometer.
Figure 2B:
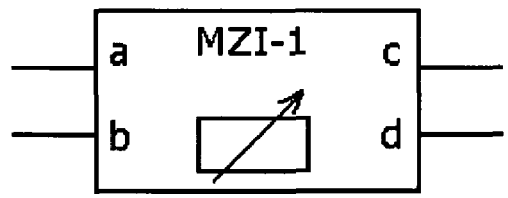

A typical layout of a waveguide MZI 20 is shown in FIG. 2a, its schematic diagram is shown on FIG. 2a. Device 20 is fabricated on single substrate 21, where single-stage MZI 22 is formed by the first and the second waveguide couplers 23 and 24 and by two waveguides 22-1 and 22-2 of unequal length, $l_1$ and $l_2$, respectively. Coupling coefficients $k_1$ and $k_2$ of couplers 32 and 24 are equal and divide optical power at ratio 50/50. One-stage MZI 22 has drops a and b at the one side, and c and d at the other side. One-stage MZI 22 contains in arm 22-2 a phase shifter 25, that gives an additional phase shift φ to the phase of the current wave, and is a controllable element that is used for adjustment of the spectral characteristics of MZI.

Value of the phase shift φ is regulated with the help of thermo-optical or electro-optical effect by changing of electric current or voltage. So, the phase shifter 25 may be manufactured with the help of thermo-optical 1 material, for example, silicone, or with the help of electro-optical material, for example, lithium niobate ($LiNbO_3$) or gallium arsenide. Such phase shifters are known in sphere of wavelength division multiplex technologies as instrument for adjustment of spectral characteristics of optical filters on the base of MZI, and also used in other devices—optical modulators and switches.

During transmission through the first input a of radiation of unit power the light intensiveness at two outputs c vι d may be expressed with the help of transmission factors $K_{ac}(v,\phi)$ and $K_{ad}(v, \phi)$ as:

$$K_{ac}(v, \varphi) = 0,5 \cdot \left[1 + \cos\left(\frac{2\pi n \Delta L v}{c} + \varphi\right)\right], \quad (1)$$

$$K_{ad}(v, \varphi) = 0,5 \cdot \left[1 + \cos\left(\frac{2\pi n \Delta L v}{c} + \varphi + \pi\right)\right], \quad (2)$$

where $D=2\pi n \Delta L v/c$ is a phase delay, induced by the optical path difference between arms 22-1 И 22-2, $\Delta L=l_1-l_2$, n is the waveguide refractive index, v is the frequency, and c is the speed of light in vacuum.

During transmission through the adjacent port b intensities of light at ports "c" and "d" can be written with the help of transmission factors $K_{bc}(\lambda,\phi)$ and $K_{bd}(\lambda,\phi)$ as:

$$K_{bc}(\lambda, \varphi) = 0,5 \cdot \left[1 + \cos\left(\frac{2\pi n \Delta L v}{\lambda} + \varphi + \pi\right)\right], \quad (3)$$

$$K_{bd}(\lambda, \varphi) = 0,5 \cdot \left[1 + \cos\left(\frac{2\pi n \Delta L v}{\lambda} + \varphi\right)\right], \quad (4)$$

At any interval of frequencies v (or wavelength λ), transmission factors (1)÷(4) become spectral characteristics (or transmissions) of one-stage MZI. As we can see, specified spectral characteristics (1)÷(4) are periodical functions of light frequency v and wavelength λ, the physical length differences of their arms ΔL, the waveguide refractive index n И phase φ. Efficiency of one-stage MZI is dependent on the following properties:

separation between adjacent extremums in spectral characteristics (1)÷(4) in frequency domain Δv and in wavelength domain Δλ are:

$$\Delta v = \frac{c}{2\Delta L n} \text{ and } \Delta \lambda = \frac{\lambda^2}{2\Delta L n}, \quad (5)$$

spectral characteristics (1)÷(4) corresponding to transfer of optical radiation from one of the inputs, a or b, to the first c or the second d outputs are π out of phase;

spectral characteristics do not change during substitution of two indexes, i.g. $K_{ad}(v,\phi)=K_{bc}(v,\phi)$ and $K_{ac}(v,\phi)=K_{bd}(v,\phi)$;

changing value of phase shift φ, it is possible to change spectral characteristics (1)÷(4), shifting them along frequencies axe (or wavelength axe); in particular, during change of the phase shift for $\delta\phi=\pm\pi$ this will lead to the inversion of signals at outputs; and spectral characteristics do not change during change of direction of signal transmission, i.g. one-stage MZI is a bidirectional device.

From these properties it is clear that during transmission of optical signal that contains several channels to input of one-stage MZI, which frequencies (or wavelengths) coincide with positions of extremums in spectral characteristics, the signal stream is divided into two streams, transmitted to different outputs. One such stream contains even channels, other streams contain odd channels; in both streams spectral interval between the channels becomes larger for two times than at the input of one-stage MZI. During transmission of the same signal to other input, even and odd channels at the outputs change their places.

Since single-stage MZI is a bidirectional device, it can combine two streams of optical signal, wherein one stream contains odd channels and the other stream contains even channels, into a single, more densely spaced optical signal stream. Devices that execute function of division of channels into even and odd channels and reverse function of combining of even and odd channels into one stream are called interleavers.

Distance between adjacent extremums Δv (or Δλ) in spectral characteristics for real one-stage MZI must be formed during its manufacturing by selection of respective differences in arm lengths ΔL and refraction index π. Controllable tuning of positions of extreme values of transmission factors relative to the set frequencies $\{v_i\}$ (or wavelengths $\{\lambda i\}$) must be executed with the help of respective regulation of phase shift φ during use of one-stage MZI as optical filter in a certain device.

Figure 3:
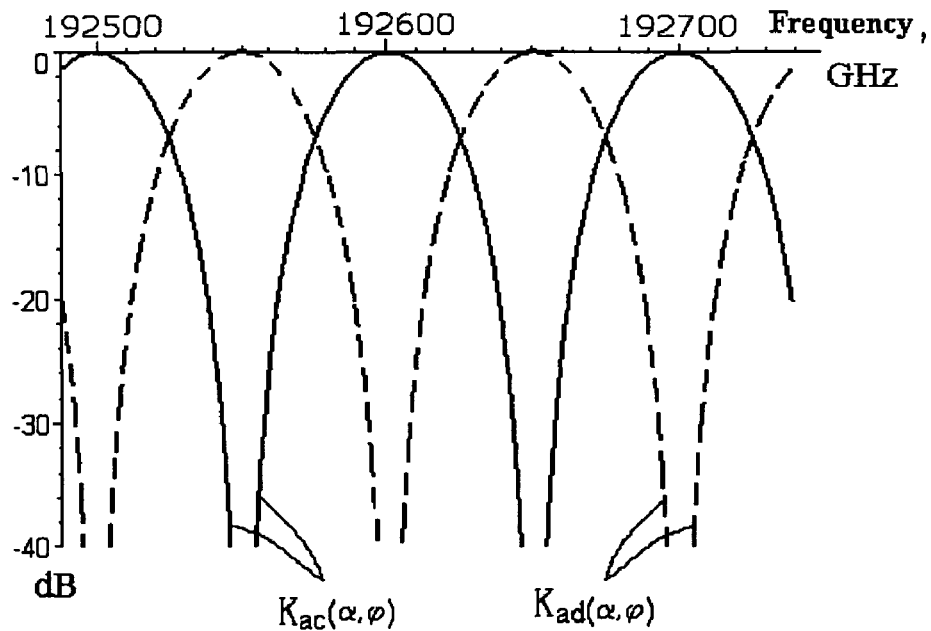

FIG. 3 shows spectral transmission factors $K_{ac}(v,\phi)$ and $K_{ad}(v,\phi)$ for single-stage MZI as functions of wavelength, that at relevant phase delay D and phase shift φ may be used as 50 GHz interleaver. Spectral relation of transmission factor $K_{ac}(v,\phi)$ is shown by solid lines, according to which one channels stream—odd channels—is transmitted to the output c; other spectral relation of transmission factor $K_{ad}(v,\phi)$ is shown by dot lines—this relation is liable for transmission of other channels stream—even channels—to output d.

One drawback for the interleaver is shown in FIG. 3 is a non-flatness in the passband and also the narrowness of the stopband. Other significant disadvantage is that fact that at great difference in arms lengths ΔL there may be a significant dispersion. These disadvantages limit application of single-stage MZIs in devices, used in systems with wavelength-division multiplexing.

Significant improvement of spectral characteristics of optical filters for devices and systems of wavelength-division multiplexing is provided by (U.S. Pat. No. 6,782,158,B), two-stage MZIs, that may be made as with the help of fiber-optical couplers, beam splitters, mirror-prisms, polarizers and other elements, so in integral-optical version and may contain a phase shifter.

Figure 4A:
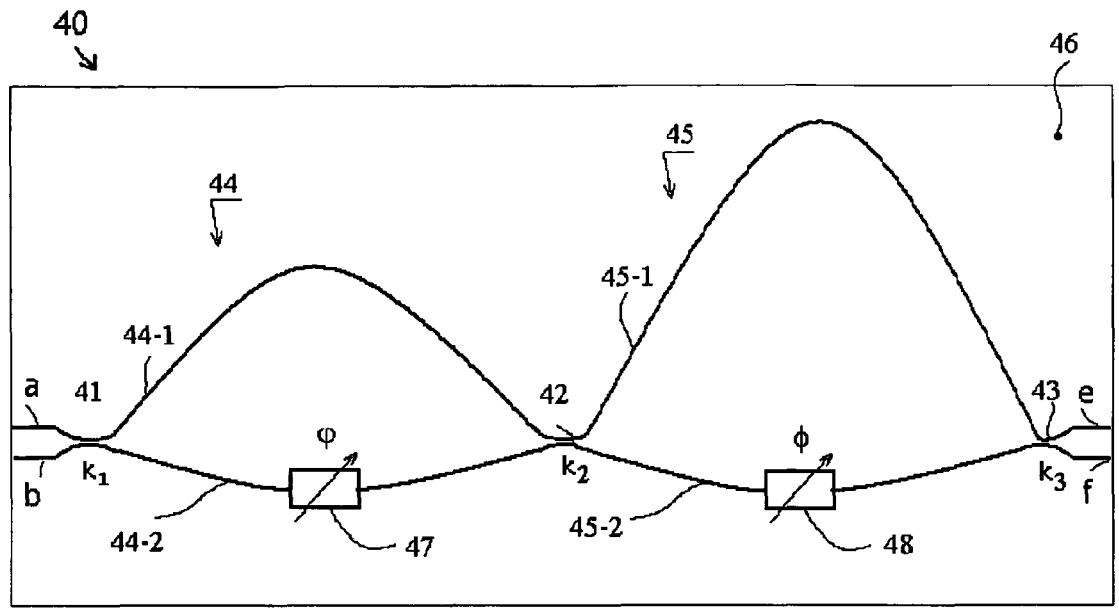
FIG. 4a—is a scheme of a waveguide unbalanced two-stage MZI.
Figure 4B:
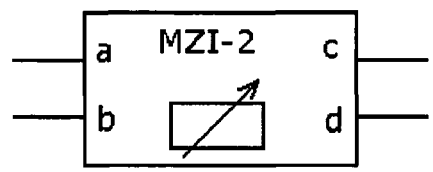

FIG. 4a shows a scheme of waveguided variant of two-stage MZI 40, its block diagram is shown on FIG. 4b. In device 40 three couplers 41, 42 and 43 are used, they have coupling coefficients $k_1$, $k_2$ and $k_3$, respectively. Device 40 is fabricated on single substrate 46. The first single-stage MZI 44 is formed by two couplers 41 and 42 and two waveguides 44-1 and 44-2 of unequal length, $l_{44-1}$ and $l_{44-2}$ respectively. The second single-stage MZI 45 is formed by two couplers 42 and 43 and by two waveguides 45-1 and 45-2 of unequal length, $l_{45-1}$ and $l_{45-2}$, respectively. The phase delays $D_1=2\pi n (l_{44-1}-l_{44-2})/\lambda$ and $D_2=2\pi n(l_{45-1}-l_{45-2})/\lambda$ are connected between each other like the following: $D_2=2 \cdot D_1$.

In MZI 44 and 45 phase shifters 47 and 48 are used; the phase shifts, caused by these devices, are marked as φ and Φ, respectively. Two-stage MZI has outputs at the one side, a and b, and outputs at other side, e and f.

Mathematically, the transmission characteristics of two-stage MZI assembly 40 may be obtained like the following. For three couplers 41-1, 41-2 and 41-3 it is necessary to enter matrixes $T(k_i)$ for (i=1, 2, 3), that relate the couplers output optical amplitudes and the input optical amplitudes:

$$T(k_i) = \begin{bmatrix} \cos(k) & -i\sin(k_i) \\ -i\sin(k_i) & \cos(k_i) \end{bmatrix}, \quad (6)$$

and for two one-stage MZI 43 and 44—matrixes $T(D_1)$ and $T(D_2)$:

$$T(D_2) = \begin{bmatrix} e^{i(D_2+\phi)} & 0 \\ 0 & 1 \end{bmatrix} T(D_1) = \begin{bmatrix} e^{i(D_1+\varphi)} & 0 \\ 0 & 1 \end{bmatrix}. \quad (7)$$

Then transmission matrix $M(v, \varphi, \Phi)$ of two-stage MZI is determined as product of five matrixes:

$$M(v, \varphi, \phi) = \begin{bmatrix} M_{ac} & M_{ad} \\ M_{bc} & M_{bd} \end{bmatrix} = T(k_3)T(D_2)T(k_2)T(D_1)T(k_1). \quad (8)$$

Since transmission factors of two-stage MZI relate the output optical intensities and the input optical intensities, for their determination it is necessary to use the following expression:

$$K_{af}(v,\phi,\Phi)=|M_{af}(v,\phi,\Phi)|^2 \quad (9)$$

From Eq. (6)÷(9) various properties of two-stage MZIs can be obtained. It is not hard to check that two-stage MZI during transmission of radiation through inputs a and b remains interleaver device. During transmission of optical signal to input a of two-stage MZI channels stream will be divided into two streams; one stream will contain odd channels, other—even channels. There is an important property of two-stage MZIs: during transmission of the same signal to other input, input b on FIG. 4a, even and odd channels at the outputs e and f change their places.

Distances between adjacent extremums Δv and Δλ in spectral characteristics are also determined by expressions (5), where ΔL is a difference in arms lengths in the first stage of two-staged MZI 40, i.g. $\Delta L=l_{44-1}-l_{44-2}$. There is still a possibility of regulation of spectral characteristics, now with the help of two phase shifts φ and Φ. To shift spectral characteristics $K_{ac}(v,\phi,\Phi)$ and $K_af(v,\phi,\Phi)$ over frequencies axe for value λv, it is necessary to change phases φ and Φ with the help of special devices:

$$\delta\varphi = -\frac{\pi \cdot \delta v}{\Delta v} \text{ and } \delta\phi = -\frac{2\pi \cdot \delta v}{\Delta v}. \quad (10)$$

Figure 1:
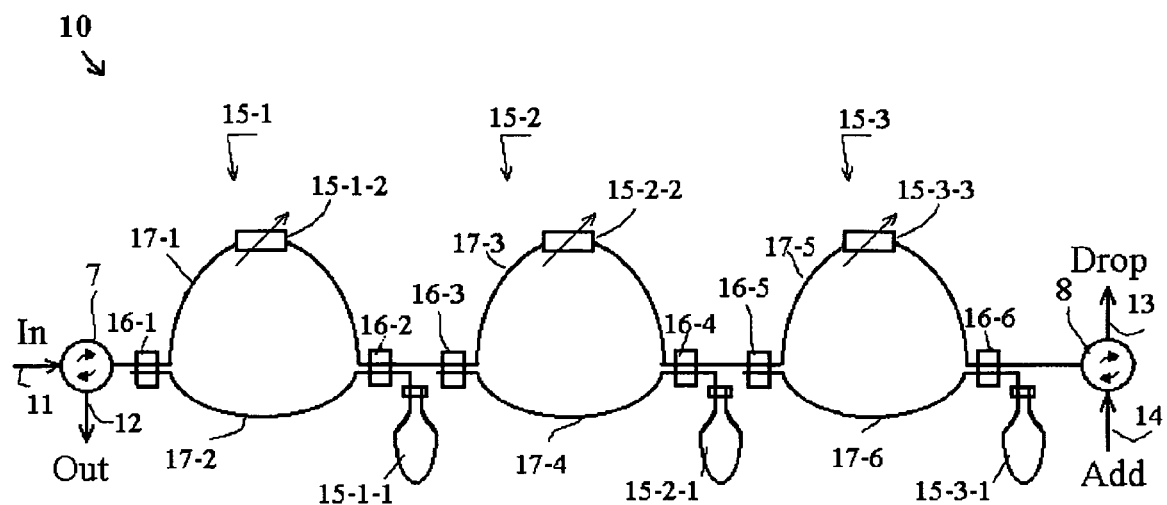
FIG. 1—is a scheme of tunable optical add/drop multiplexer of the prior art.

With the help of expressions (6)+(9) we can see that during transmission of signal through outputs e and f there is no possibility to divide the signal into even and odd channels. This is because matrixes (6) and (7) are noncommutable. So, two-stage MZI are not bidirectional devices—two port a and b at the one side may be used only as input ports, and two other ports e and f at the other side may be used only as output ports, that's why two-stage MZIs cannot be used in controllable optical add/drop multiplexer, shown on FIG. 1.

Figure 5:
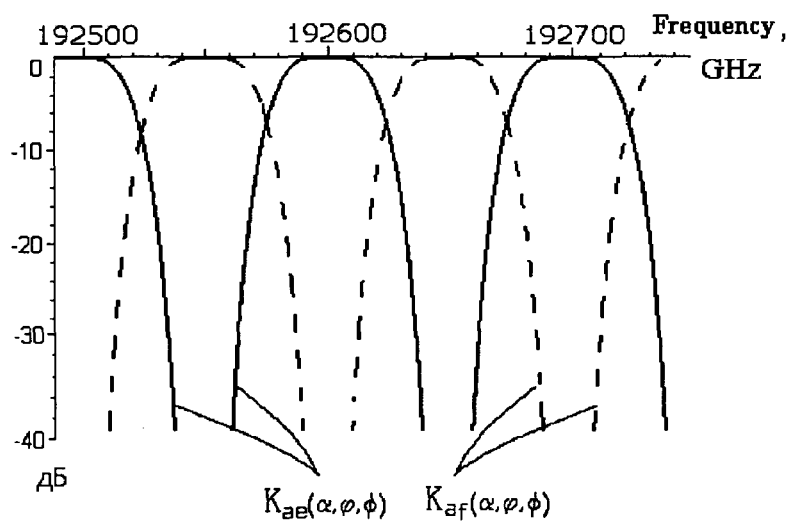

FIG. 5 shows transmission $K_{ae}(v,\phi,\Phi)$ and $K_{af}(v,\phi,\Phi)$ as functions of wavelength for the two-stage MZI, calculated with the help of expressions (6)+(9). This two-stage MZI with coupling coefficients $k_1$=0.7854, $k_2$=2.0944, $k_3$=0.3218, and respective phase delays $D_1$ and $D_2$ and phases φ and Φ may be used as 50 GHz interleaver. Spectral relation of transmission factor $K_{ae}(v,\phi,\Phi)$ is shown by solid lines, according to which one channels stream—odd channels—is transmitted to the output e; other spectral relation of transmission factor $K_{af}(v,\phi,\Phi)$ is shown by dot lines—this relation is liable for transmission of other channels stream—even channels—to output f.

As we can see, two-stage MZI has better form of spectral characteristics—it is close to square channel shapes that exhibit flat top and steep sides. That's why two-stage MZI is used as optical filter, provides better crosstack suppression and channel isolation. However, a dispersion of two-stage MZI is rather high that restricts its application as optical filter in communication systems with high speed of data transmission.

It is known that the situation may be improved by use of filters, obtained as a result of cascading of two-stage MZIs. One of the variants of such devices provides use of two-stage MZIs with identical transmission and dispersions that opposite in sign to, so called complementary two-stage MZIs. Complementation is provided by certain ration of coupling coefficients $k_q$, $k_2$ and $k_3$ in MZIs (U.S. Pat. No. 6,782,158, B2).

Figure 6A:
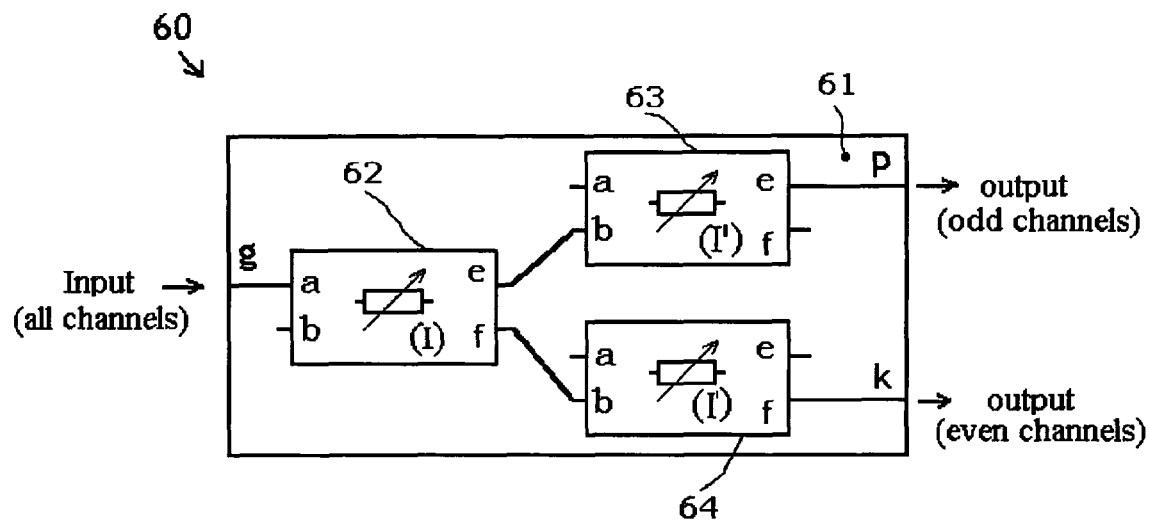
FIG. 6a—is a scheme of multi-stage filter that contains three two-stage MZI.
Figure 6B:
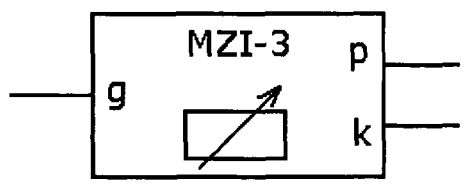

FIG. 6a shows one of variants of multi-stage MZI 60 that may be used for segregation into odd and even channels; block diagram of multi-stage MZI (MZI-3) is shown on FIG. 6b. device 60 in planar version is fabricated on single substrate (crystal) 61, it has input port g, first output port p and second output port k and includes three two-stage MZI that have first input a, second input b, first output e and second output f In the first stage two-stage MZI 62 of type I is used, in the second stage two two-stage MZI 63 and 64 of type I' (dispersions are opposite in sign to) are used.

During transmission of the signal through input port g two-stage MZI 62 as usual separates even and odd channels; at the second stage MZI 63 transmits odd channels to its first output e and further to outer first output port p, and MZI 64 transmits even channels to its output f and further to outer second output port k. Since dispersions of two-stage MZI 62 and two-stage MZIs 63 and 64 are opposite in sign to, dispersion of multi-stage MZI 60 is compensated—zero or almost zero.

Unfortunately, multi-stage MZIs have a disadvantage: during transmission of optical signal through the second input b of two-stage MZI 62 the streams with odd and even channels do not just change their places at the outputs of two-stage MZIs 63 and 64, but are transmitted to other outputs than during transmission of optical signal through input a (to outputs f and e of two-stage MZIs 63 and 64 respectively). This disadvantage limits application of the multi-stage MZIs in the first variant of application, discussed below (realization in controllable optical add/drop multiplexer in compliance with this invention).

Figure 7:
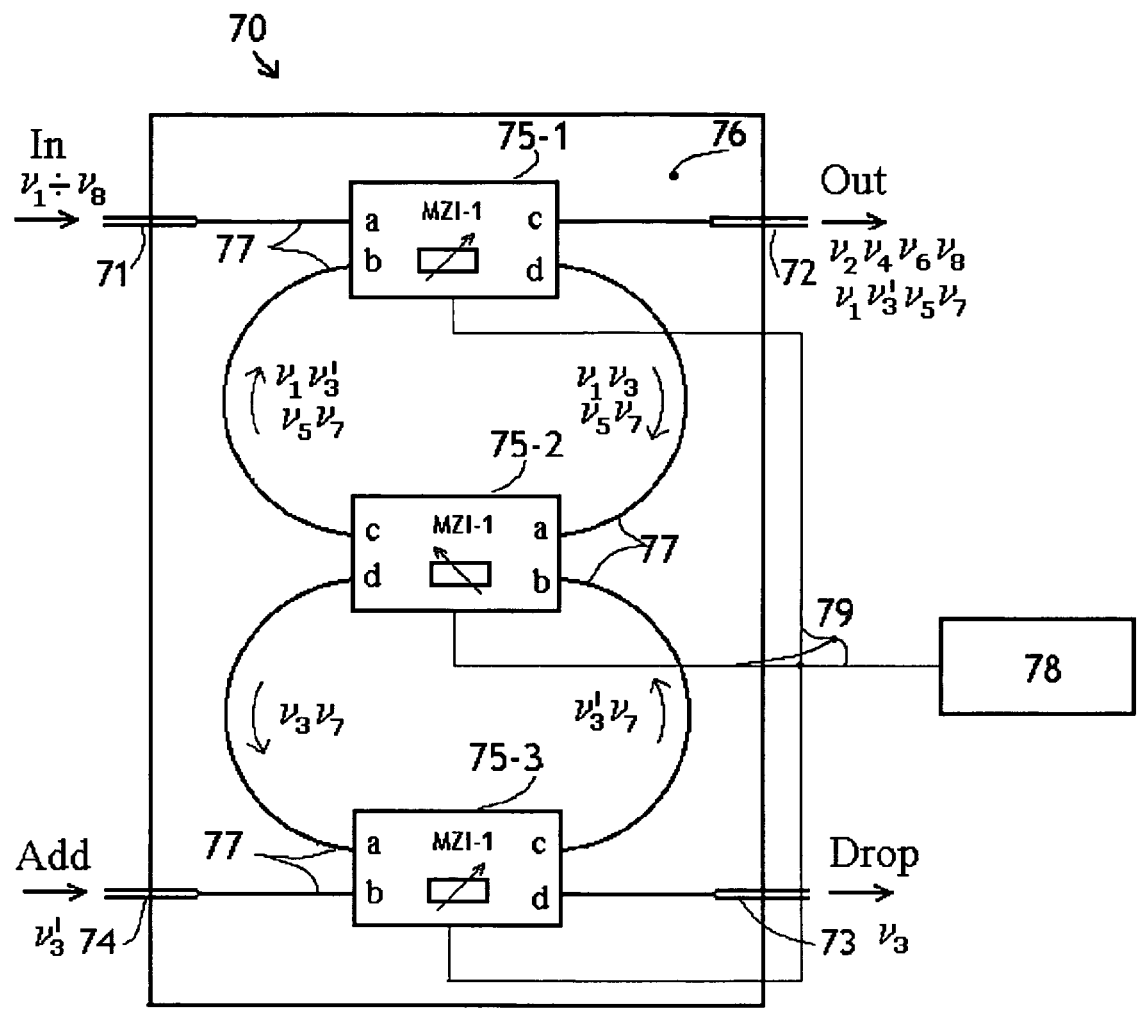
FIG. 7—is a scheme of controllable optical add/drop multiplexer that in compliance with the invention contains one-stage MZIs, with illustration of operation during supply of optical signal with 8 CWDM channels to input port.

A first embodiment of tunable optical add/drop multiplexer device 70 according to the present invention, shown in FIG. 7, meant for use in CWDM technology (in metro and access networks).

Multiplexer 70 includes one input port 71, one output pass+add port 72, one drop port 73, one add port 74 and three optical filters 75-1, 75-2 and 75-3, that form a multi-stage structure. The device in planar form is integrated on a common silicone substrate 76. Four ports 71÷74 are made in the form of light guides. Filters of the three stages are connected between each other and with waveguides 77, formed on silicone substrate. Dynamic control of the multiplexer is executed by tuning of the spectral characteristics of three filters 75-1, 75-2 and 75-3 during transmission of respective voltage to phase shifters, present in all three filters. Control is executed with the help of controller 78 that is connected with optical filters 75-1, 75-2 and 75-3 in electric bus 79.

As optical filters single-stage MZIs shown on FIG. 2a or two-stage MZIs shown on FIG. 4a may be used. The filters of each stage, except the first one, by one of the inputs (a) and one of the outputs (c) are connected with one of the outputs (d) and one of inputs(b) of optical filter of the previous stage correspondingly; the first filter 75-1 is connected by other input with input port 71 and by other output—with output port 72; the last filter 75-3 is connected by other input with add port 74 and by other output—with drop port 73.

Let us notice, that connections of optical filters in device 70 are not the only possible variant, further we shall describe another variant of connection of optical filters. Advantage of this connection is that fact that in planar version of device 70 waveguides 77 are not crossed with each other.

Let us discuss a situation when 8-channel optical signal with frequency interval between the channels $\Delta v=2400$ GHz (average interval between the channels $\Delta\lambda\approx 20$ nm) is transmitted to the input of multiplexer 70. Since in this example spectral interval between the channels is big, one-stage MZIs are used as the interleaver (or optical filter).

To provide selected interval between the channels $\Delta v=2400$ GHz, for three one-stage MZIs the distances between adjacent extremums in spectral characteristics (transmissions) are selected so, that during transfer to the next one-stage MZI they grow for two times: $\Delta v_{75-1}=2400$ GHz, $\Delta v_{75-2}=4800$ GHz и $\Delta v_{75-3}=9600$ GHz. So, according to expression (5) the difference of optical path $\Delta L$ of the three single-stage MZIs is the following: $\Delta L_{75-1}=41.6$ mkm, $\Delta L_{75-2}=20.8$ mkm and $\Delta L_{75-3}=10.4$ mkm (it is supposed that $\pi=1, 5$). Central wavelengths of 8 channels at selected spectral interval between the channels $\Delta v$ may be located like the following: $\lambda_1=1608.5$ nm, $\lambda_2=1588.3$ nm, $\lambda_3=1568.4$ nm, $\lambda_4=1549.0$ nm, $\lambda_5=1530.0$ nm, $\lambda_6=1511.5$ nm, $\lambda_7=1493.5$ nm and $\lambda_8=1475.8$ nm.

Let us suppose that at certain specified values of phases ($\phi^*_{75-1}$ $\phi^*_{75-2}$ и $\phi^*_{75-3}$, that we specify as $\{\phi^*_n\}$) for one of the waves, for example for wave $v_3$, transmission from input port 71 to drop port 73 will be provided. It is clear that these conditions will be observed during coincidence of maximum values of transmission factors of three filters at wavelength $\lambda_3$:

$$K_{ad}^{75-1}(v_3,\phi_{75-1}^*)=K_{ad}^{75-1}(v,\phi_{75-2}^{*2})=K_{ad}^{75-3}(v_3,\phi_{75-3}^*)\approx(1,0) \quad (11)$$

For better understanding of the device operation it is necessary to describe in details spectral characteristics of three optical filters 75-1, 75-2 and 75-3.

At specified distances between adjacent extremums $\Delta F_{75-1}, \Delta F_{75-2}$ and $\Delta F_{75-3}$ and under conditions (11) transmission factor $K_{ad}^{75-1}(v,\phi^*_1)$ for optical filter 75-1 have maximum value for odd waves $v_1$, $v_3$, $v_5$ and $v_7$ and minimum value for even waves $v_2$, $v_4$, $v_6$ and $v_8$; transmission factor $K_{ad}^{75-2}(v,\phi^*_2)$ for optical filter 75-2 has maximum values for waves $v_3$ and $v_7$ and minimum values for waves $v_1$ and $v_5$; transmission factor $K_{ad}^{75-3}(v,\phi^*_3)$ for optical filter 75-3 has maximum value for wave $v_3$ and minimal value for wave $v_7$. It is also necessary to consider invariance of transmission factors of one-stage MZIs during exchange of lower indexes.

So, multiplexed signal that contains 8 spectral channels is transmitted from optical network to input port 71. Optical filter 75-1 according to its transmission factor $K_{ac}^{75-1}(v,\phi^*_1)$ directs waves $v_1$, $v_3$, $v_5$ and $v_7$ to optical filter 75-2, and waves $v_2$, $v_4$, $v_6$ and $v_8$ transmits to output port 72. Optical filter 75-2 according to its transmission factor $K_{ad}^{75-2}(v,\phi^*_2)$ transmits waves $v_3$ and $v_7$ to optical filter 75-3, and waves $v_1$ and $v_5$—back to optical filter 75-1, these waves transmit the filter at $K_{bc}^{75-1}(v_1,\phi^*_1)=K_{bc}^{75-2}(v_5,\phi^*_1)=1$ and get to output port 72. Optical filter 75-3 directs wave $v_3$ according to transmission factor $K_{ad}^{75-3}(v_3,\phi^*_3)$ to drop port 73, and returns wave $v_7$ at $K_{ad}^{75-3}(v_3,\phi^*_3)=1$ at first to optical filter 75-2, and then this wave $v_7$ at $K_{bc}^{75-2}(v_7,\phi^*_2)=1$ passes to optical filter 75-1, with the help of which it gets to output port 72 at $K_{bc}^{75-1}(v_7,\phi^*_1)=1$.

It is not hard to fix motion path of wave $v'_3$ (at that $v'_3=v_3$), transmitted through add port 74. For this wave during consequential transmission through three optical filters 75-1, 75-2 and 75-3 to output port 72 values of respective transmission factors are equal to one: $K_{bc}^{75-3}(v'_3,\phi^*_3)=K_{bc}^{75-2}(v'_3,\phi^*_2)=K_{bc}^{75-1}(v'_3,\phi^*_1)=1$, that's why wave $v'_3$ is transmitted to output port 72.

So, connection of the second output of optical filters 75-2 and 75-3 with one of the inputs of the previous filter provides recombining of new added channel $v'_3$ and channels that do not contain the selected channel $v_3$, and their transmission back to the first optical filter 75-1, from where they return to the optical network.

Let us discuss operation of device 70 in dynamic, when any selected channel may be subject to add/drop. For this purpose it is necessary to change values $\{\phi n\}$ of phase shifts for three optical filters, using expression (10). For example, to go to add/drop mode of adjacent wave $v_4$, it is necessary to change phase shifts like the following: $\delta\phi_{75-1}=\pi$, $\delta\phi_{75-2}=\pi/2$ и $\delta\phi_{75-3}=\pi/4$.

In Table 1 changes of phase shifts $\{\delta\phi_n\}$, required for add/drop of any of 8 channels, are specified.

TABLE 1

Frequencies of add/drop channels and respective changes of phase shifts $\{\delta\phi_n\}$

| | Frequency of | Changes of phase shifts $\{\delta\phi_n\}$ | | |
|---|---|---|---|---|
| Channel number | add/drop channels | $\delta\phi_{75-1}$ | $\delta\phi_{75-2}$ | $\delta\phi_{75-3}$ |
| 1 | $v_1$ | 0 | $-\pi$ | $-½\pi$ |
| 2 | $v_2$ | $-\pi$ | $-½\pi$ | $-¼\pi$ |
| 3 | $v_3$ | 0 | 0 | 0 |
| 4 | $v_4$ | $\pi$ | $½\pi$ | $¼\pi$ |
| 5 | $v_5$ | 0 | $\pi$ | $½\pi$ |
| 6 | $v_6$ | $\pi$ | $1½\cdot\pi$ | $¾\pi$ |
| 7 | $v_7$ | 0 | 0 | $\pi$ |
| 8 | $v_8$ | $\pi$ | $½\pi$ | $1¼\cdot\pi$ |

Note, that in Table 1 changes of the phase shifts $\{\delta\phi n\}$, may be changed for equivalent ones $\{\delta\phi vn\}$ > such, that $\delta\phi = \delta\phi n \pm 2\pi n$, where $n = 1, 2, \ldots$ After the present invention the second variant of the controllable optical add/drop multiplexer is provided for DWDM-systems. The scheme of the multiplexer 80 after this variant is given on FIG. 8. Let's suppose that the signal on input contains 64 channels, frequencies of the channels correspond to the ITU-standard and have spectral range between channels Δν=50 GHz.

The multiplexer has one input port 81, one output port 82, one drop port 83, one add port 84 and includes six optic filters 85-1, 85-2, 85-3, 85-4, 85-5, 85-6, that also forming a multi-stage structure. Additionally a multiplexer contains a combiner 86, that has seven inputs and output. All six filters and are integrated on a substrate 87. Four ports 81, 82, 83 and 84 are made in the form of light guides. Connection of the filters with waveguides, and also the rest connections are done by means of waveguides 88.

Dynamic control of operation of the multiplexer is done by readjustment of spectral characteristics of six filters 85-1÷85-6 during transfer of phase shift of all six filters of corresponding voltages to the devices. Control is carried out with the help of a controller 89 that is connected with optical filters by an electric bus-bar 89-1.

The fact that at input signal spectral channels are connected significantly closer to each other requires usage of the elements with higher characteristics, specifically with better insulation of the channels, and also for usage of the multiplexer at higher transfer speed, with little dispersion. At that it must be taken into account that cross talk in the adjacent channels, and introduced dispersion also occur first of all in the filters of the first stages, where spectral ranges between the channels are small on input, but differences in the arm lengths in MZI and correspondingly larger introduced dispersion. In the next stages intervals between channels become bigger, and introduced dispersion—becomes smaller. Correspondingly the requirements to the optical filters in these stages can be lower.

That is why according to the present invention in the second traced variant of the controllable optical add/drop multiplexer in the first three stages multi-stage MZIs are used that are shown on FIG. 6a, and in the subsequent stages—two-stage MZI that are shown on FIG. 4a. It is obvious that in this variant multiplexer 80 turns to be easier and cheaper in the production, than if it would be done only on the basis of multi stage MZI.

Optical filters are connected successively with each other in such a way, that the first output of one filter is connected with the input of the other, the second output of each filter is connected with one of the inputs of the optical adder, the input of the first filter 85-1 is connected with input port 81, output of the last filter 85-6 is connected with the drop port 83, and optical adder 86 is connected with input port 84 by one input, and by output—with output port 82.

Distances between proximate extremums in spectral characteristics of six optical filters are fixed in such a way that during the transfer to the next optical filter they increase twice: $\Delta v_{85-1}$=50 GHz, $\Delta v_{85-2}$=100 GHz, $\Delta v_{85-3}$=200 GHz, $\Delta v_{85-4}$=400 GHz, $\Delta v_{85-5}$=800 GHz and $\Delta v_{85-6}$=1600 GHz. Correspondingly, the difference of optical path ΔL of the MZIs in the first stages of the operated multi-stage and two-stage MZI must be the following: $\Delta L_{85-1}$=2000 mkm, $\Delta L_{85-2}$=1000 mkm, $\Delta L_{85-3}$=500 mkm, $\Delta L_{85-4}$=250 mkm, $\Delta L_{85-5}$=125 mkm and $\Delta L_{85-6}$=62.5 mkm.

Let us suppose, that for one wave, for example, for the wave $v_3$, at some fixed values of phases $\{\phi^*_n\}$ and $\{\Phi^*_n\}$. Correspondingly, in the first and second stages of two staged MZI, that are used in all six optical filters, the similar conditions are executed (11) that ensure travel time of the wave by trace from input port 81 to drop port 83.

Operation of device 80 at such phases $\{\phi^*_n\}$ и $\{\Phi^*_n\}$ is carried out in such a way that input signal comes to input port 81, optical filter 85-1 divides channels into two groups—a group of odd waves $v_1, v_3, \ldots, v_{63}$, that forward to optical filter 85-2, and a group of even waves $v_2, v_4, \ldots, v_{64}$, that forward to optical combiner 86.

The process is repeated many times: optical filter 85-2 divides waves again and forwards waves $v_3, v_7, \ldots, v_{59}, v_{63}$ to the optical filter 85-3, and waves $v_5, v_9, \ldots, v_{57}, v_{61}$ to the adder 86, and this process continues up to the moment when the last optical filter 85-6 at last will divide two waves $v_3$ and $v_{35}$ that arrive to it. As a result a wave $v_3$ that go to the drop port 83 is separated, and all others 63 waves after passing through the adder 86 occur in output port 82. Wave $v'_3$ that is input through the port 84 also goes to output port 82.

During operation of the multiplexer 80 in dynamic mode, that is required for provision of input/output of any other waves, it is necessary to change values of phases $\{\phi_n\}$ and $\{\Phi_n\}$ for all optical filters that are used according to the expressions (10). As well as for the multiplier, that had been described above 70 (FIG. 7), this condition is possible when neither of waves are output; all pass through BOCC. Quantity of the devices of the phase shift in the third variant of the multiplexer is significantly more than in the first variant, but the aim of the corresponding restructuring of phases $\{\phi_n\}$ и $\{\Phi_n\}$ does not rise principal difficulties.

Possible optical losses and different level of channels for passing channels may be compensated with a help of usual devices that are used in techniques DWDM of optical amplifier and/or spectral equalizer.

Figure 9:
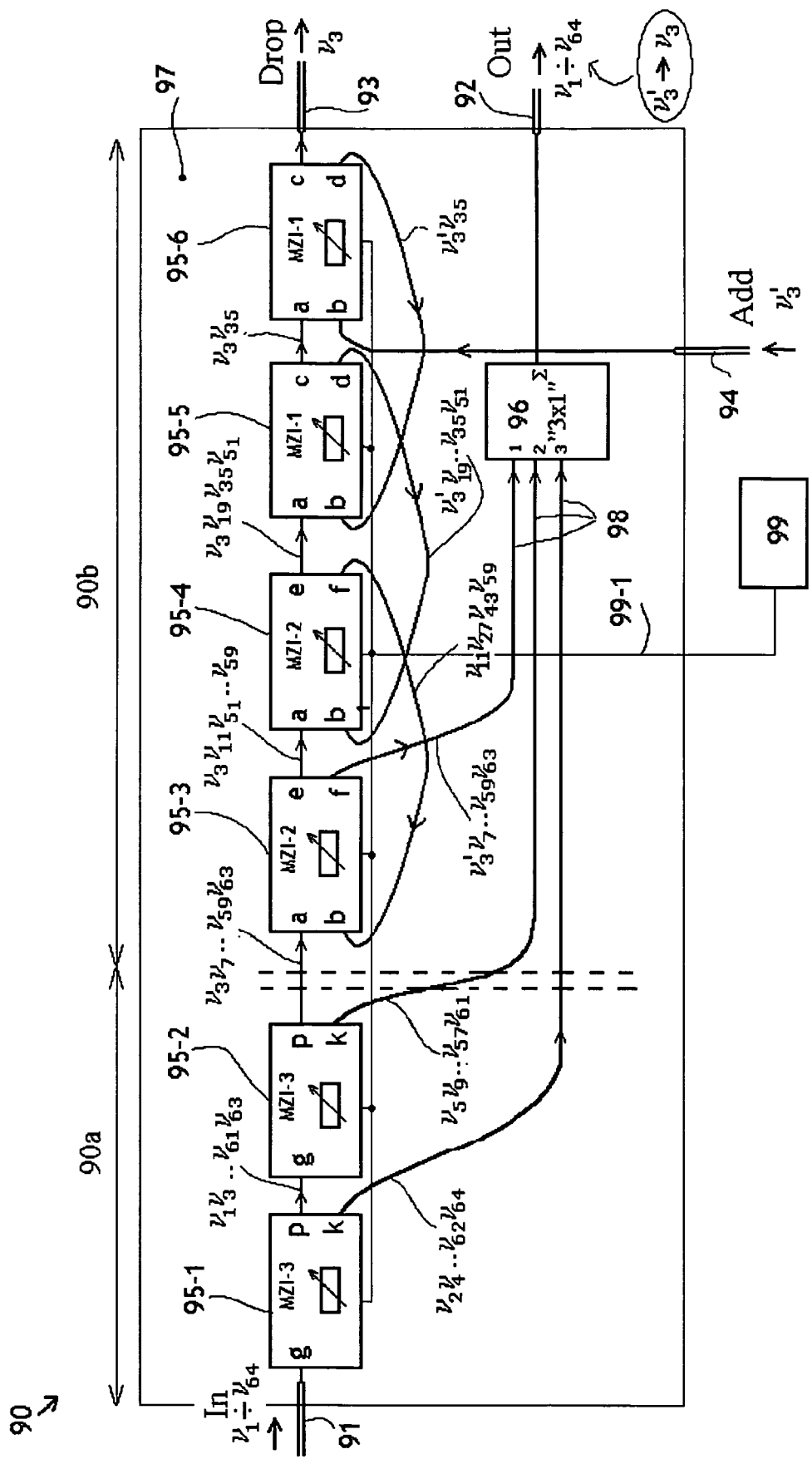
FIG. 9—is a scheme of controllable optical add/drop multiplexer that in compliance with the invention contains one-stage, two-stage and multi-stage MZIs, with illustration of operation during supply of optical signal with 64 DWDM channels to input port.

The third variant of the controllable optical add/drop multiplexer may be also used in DWDM systems of wave length division multiplexing according to the present invention. The circuit of the multiplexer 90 that corresponds to the following variant is given on FIG. 9. Let us believe that a signal on input contains 64 channels, frequency of the channels correspond to the ITU-standard and have spectral range Δν=50 GHz between the channels. Let us suppose also, that frequencies of the channels in this case are kept within the limits of their nominals more strictly, and speed of data transfers is low. That is why the requirements to insulation of channels and introduced dispersion for operated optical filters may be lowered in the second variant of realization of a controllable optical add/drop multiplexer.

The multiplexer 90 has one input port 91, one output port 92, one drop port 93, one add port 94 and includes six optical filters 95-1, 95-2, 95-3, 95-4, 95-5 and 95-6, that form two multi-stage structures that contain: in the first structure there are two optical filters 95-1 and 95-2, and in the second structure—four optical filters 95-3, 95-4, 95-5 and 95-6. Optical filters 95-1 and 95-2 are multi-stage MZI, that are shown on FIG. 6a, filters 95-3 and 95-4—two-stage MZI, that are shown on FIG. 4a and filters 95-5 and 95-6—by one stage MZI, that are given on FIG. 2a.

The distance between proximate extremum in spectral characteristics of six optical filters are set in such a way that during a transfer to the next optical filter it expands twice $\Delta v_{95-1}$=50 GHz, $\Delta v_{95-2}$=100 GHz, $\Delta v_{95-3}$=200 GHz, $\Delta v_{95-4}$=400 GHz, $\Delta v_{95-5}$=800 GHz and $\Delta v_{95-6}$=1600 GHz.

Additionally the multiplexer 90 contains an optical combiner 96 that has three inputs and one output. All six filters and adder are integrated on an uniform substrate 97. Four ports 91÷94 are made of the light guides. Connection of filters with light guides, and also all other connections are done with the waveguides 98.

The multiplexer 90 is a combination of the first and second variant of the multiplexers according to the invention. The first two optical filters 95-1 and 95-2 are connected successively as like as in the multiplexer 80 with connection of second outputs to the optical adder and form the first multi stage structure. The second multi stage structure with four optical filters is given on FIG. 9 in the form of optical filters situated in line; in this second structure optical filters are connected with each other in such a way, as in the multiplexer 70, each filter, except the first one, is connected by one of the inputs and one of the outputs correspondingly to one of the outputs and one of the inputs of the previous filter.

One of the inputs of the first optical filter 95-1 is connected with input port 101, one of the outputs of the last optical filter 95-6 is connected with output port 103 and one of the inputs of the last optical filter 95-6 is connected with the input port 94. The third input of the optical adder is connected with one of the outputs of the optical filter 95-3, the output of the adder is connected with output port 92.

Dynamic control of operation of the multiplexer is carried out by readjustment of the spectral characteristics of six filters 95-1÷95-6 during supply of corresponding voltages to the devices of a phase shift of all six filters. Control is done with a help of a controller 99, which is connected to optical filters of all optical filters by an electric bus bar 99-1. Functioning of the multiplexer that consists of two multi-stage structures of the optical filters, in each structure is carried out similar to the functioning of the first and second variants of realization of the multiplexer traced above.

In the third variant of realization of the controllable optical add/drop multiplexer in more general case of add/drop of one channel from a set of channels $2^N$, the multiplexer must include two multi-stage structures of optical filters: the first structure on multistage MZI (FIG. 6a) with number of stages N] and the second structure of optical filters on one stage MZI (FIG. 2a) or/and on two stage MZI (FIG. 4a) with total number of stages in the second structure $N_2$.

Total number of optical filters must be $Ni+N_2=N$, the distance between proximate extremums in spectral characteristics of six optical filters must be set in such a way, that during transfer to the next optical filter it increased twice. Separately quantity of one-stage, two-stage and multi-stage MZI must be chosen on the basis of the requirements to the spectral range between the channels $\Delta v$ and data transfer speed. Important factor of choice of optical filters that are used in the both structures may be a cost of the multiplexer production.

Additional functionality of the three variants of the multiplexer according to the present invention consists in possibility of operation of those devices in the mode that provides drop and passing without adding of new signals on optical carrying dropping channels at one time for one or several separate channels; at that all the other channels as usual are to be transferred to the output port.

Figure 8:
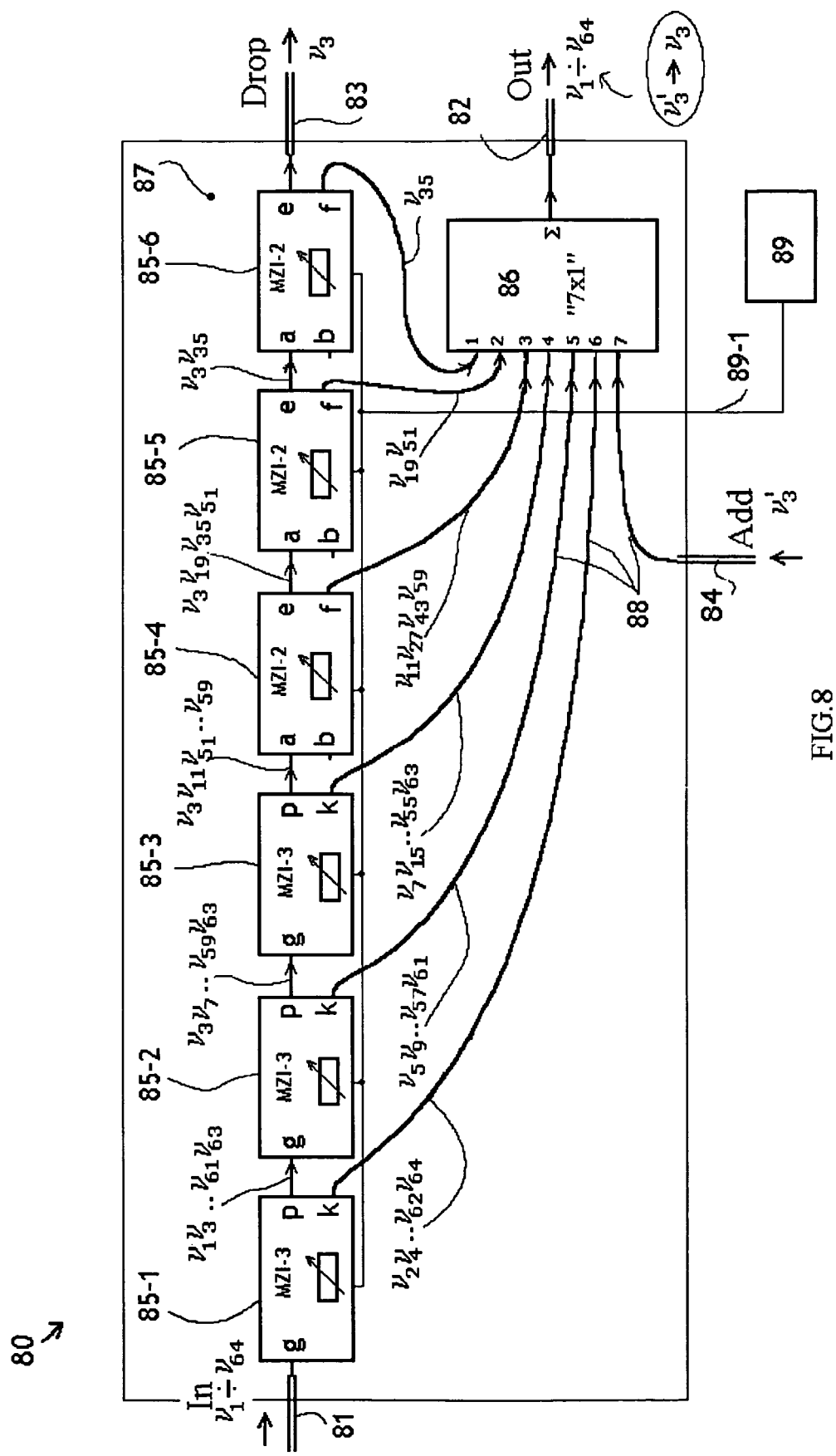
FIG. 8—is a scheme of controllable optical add/drop multiplexer that in compliance with the invention contains multi-stage MZIs, with illustration of operation during supply of optical signal with 64 DWDM channels to input port.

Let us illustrate additional functional possibility by the example of the second variant of the multiplexer 80 (FIG. 8). Let 32 channels go to the input port 81, for example, waves $v_1 \div v_{32}$, and it is necessary to drop and pass channel with optical frequency v3. In order to realize such mode (let's call it "drop/pass" mode), it is necessary to keep phase shifts $\{\phi^*_n\}$ и $\{\Phi^*_n\}$ corresponding to the traced case of add/drop of wave $v_3$, for all optical filters except the last one, and value of the phase shift $\phi_6$ и $\Phi_6$ for the last optical filter 85-6 must be fixed in such a way that division of optical power 50:50 was provided for wave $v_3$ In a similar way at corresponding adjustment of phases $\{\phi_n\}$ and $\{\Phi_n\}$ of all six optical filters it is possible to provide the following mode for any other wave. In order to make mode of "drop/passing" for two channels, for example, with frequencies $v_3$ and $v_{19}$, it is necessary to readjust phase shiftings for the filter 85-6, in order to have a division 50:50 for waves $v_3$ and $v_{19}$. It is easy to continue description of the corresponding changes of phase shiftings in optical filters for provision of mode of "drop/passing" of the other pairs of channels, and also 4 and more channels.

In the described variants of the multiplexer according to the present invention one strategy of work is used. It lies in usage of multi stage structure of optical filters on the basis of non-symmetric MZI. Optical filter of each stage, except the filter of the last stage, is connected with input of the filter in the next stage. For each filter coefficients of transfer on carrier frequencies that arrive to inputs of the channels have extremum values: for odd channels—minimal values, for even channels—maximum values, and vice versa.

During passing of multi channel optical signal through a multi stage structure in each filter division of the channels into two groups is carried out, one—containing odd, the other containing even channels, at that in one group there is a channel that is the subject of add/drop. Spectral characteristics of the optical filters are adjusted in such a way that the group that is forwarded to the optical filter in the next stage, always contains chosen channel; as a result only one channels arrives to the drop port—chosen channel of add/drop.

All the rest channels together with added channel are united and directed to the output port. Multiplexing of channels is done with the help of additional connectors between filters using characteristics of their transmission coefficients, or with the help of an optical adder. Thus a selective add/drop of one channel is carried out, at that required spectral characteristics of the channels and minimal dispersion are ensured.

Operational principle, characteristics and possible variants of realization of the present invention had been described above by the examples of operation of corresponding devices in the optical systems, in which wave lengths corresponded to ITU-standard. That is why in the traces examples multiplexers functioned as reconfigurable add/drop optical multiplexers ROADM.

But the controllable add/drop optical multiplexers according to the present invention are more flexible and multi purpose than usual ROADM, as they may be used controllable optical add/drop multiplexers in the systems where optical wave length of the channels may be readjusted, and that is why they require corresponding readjustment of spectral characteristics of multiplexers. Required readjustment of spectral characteristics may be easily done with the help of phase shifting devices that are located in optical filters, similar as it had been shown on examples described above.

Electro-optical devices as well as thermo-optical may by used as phase shifting devices in all variants, at that electro optical devices of phase shifting may guarantee extremely high speed of restructuring of spectral characteristics of the multiplexer.

Application of the integral-optical technologies for production seems to be a decisive factor for the fact that multiplexers of the present invention correspond to the requirements that are imposed to the devices of similar purpose—big quantity of channels, environment resistance, high operation speed and etc.

Application in the structure of the devices of unified type elements—one-stage, two-stage and/or multi-stage MZI, —will make possible to use automated technological operations, that in its turn with ensure technical characteristics and relatively low cost of production of the multiplexers.

Choice of this or that variant of execution of a controllable selective add/drop of one channel and a controllable optical add/drop multiplexer according to the invention, and also optical filters that are used in them—one-stage, two-stage and multi-stage MZI, —may be carried out taking into account specific character of the definite optical connection system that is used in them.

The traced examples clarify operational principle, characteristics and possible variants of the present invention structure. Specialists in a sphere of fiber-optic communication systems must understand that within the frames of the present invention other modifications and alternative variants of design of the controllable optical add/drop multiplexers are possible that do not outside the framework of the invention formula.

The method of controllable selective add/drop of channels according to the invention and controllable optical add/drop multiplexers according to the present invention may be used in fiber optic communication systems with wavelength division multiplexing, including communication long-haul telecommunication systems, in which technologies DWDM are used, and in metro and access networks, in which technology CWDM is used.

The controllable optic multiplexer as per the present invention can be realized by means of existing integrated-optical technology. Use of integrated-optical technology in manufacturing is determinative in order that the controllable optic multiplexer according to the present invention had necessary stability to external actions, large amount of channels and fast response. Use of unified build-in-unit in structure—single-stage and/or two-stage and/or multi-stage MZIs allows apply automated processing procedures that will provide high characteristics and relatively low manufacturing cost of multiplexers.

The examples discussed above explain a principle of operation, characteristics and possible versions of structure of the present invention. It is apparent to those skilled in the art that modifications and alternative embodiments can be made without departing substantially from the teachings of the invention.

What is claimed is:

1. The controllable optical add/drop multiplexer for fiber-optic communication system provided with $2^N$ of wavelength-division multiplexing channels, whose optical frequencies at a constant frequency separation $\Delta v$ between two adjacent channels are retunable, that have one input port, one output port, one drop port and one add, further comprising:
   an N-stage structure, where each stage, at n=1, 2, ..., N, contains an optical filter having one input (g or a) and two outputs (p, κ or e, f) and characterizing by transmission in form periodic function with spectral separation between two adjacent extremums $\Delta v_n = 2^{n-1} \Delta V$ and having a possibility of controllable tuning transmissions;
   connected between each other the first and the second multi-stage structures having in the first structure has $N_1$ stages and in the second structure has $N_2$ stages, $N_1+N_2=N$, and characterizing by transmission in form periodic function and having a possibility of controllable tuning transmissions;
   an optical combiner (96), that has Ni+1 inputs and one output; and
   a controller (99) for tuning of transmission of said optical filters [95-1, . . . 95-6] of the first and second multi stage structures (90a, 90b).

2. The controllable optical add/drop multiplexer of claim 1, wherein:
   an optical filter (95-1, 95-2) in the first multistage structure (90α) has one input (g) and two outputs (p, κ) and is characterized in n1-stage at n1=1, 2, . . . , N1 by spectral separation between two adjacent extremums $\Delta v_{n1} = 2^{n1-1} \Delta v$; and
   an optical filter (95-3, . . . , 95-6) in the second multi-stage structure has two inputs and two outputs and is characterized in $n_2$ stage at $n_2=1, 2, \ldots, N_2$ by spectral separation between two adjacent extremums $\Delta v_{n2} = 2^{n2+N1-1} \Delta v$.

3. The controllable optical add/drop multiplexer of claim 1, wherein:
   in the first multi-stage structure (90α) optical filter (95-1) of each stage, except the last one is connected with input (α) of optical filter of the next stage by one output (p) and, and by the other output (k) with one of the inputs of said optical combiner;
   in the first multistage structure (90α) optical filter (95-2) of the last stage is connected with the other input of said optical combiner by one output (κ), and is connected with one of the inputs of the optical filter of the first stage of the second multi stage structure (90b) by the other output (p);
   in the second multi-stage structure (90b) optical filter of each stage (95-4, 95-5, 95-6) except the first one is connected with one of the inputs (a) and one of the outputs (f) with one of the outputs (e) and one of the inputs (b) of the optical filter of previous stage correspondingly;
   in the second multi-stage structure (90b) optical filter (95-3) of the first stage is connected with the other input of the optic adder by the other output (f);
   in the first multi-stage structure (90a) optical filter (95-1) of the first stage is connected by the input (g) with the input port (91);
   in the second multi-stage structure (90b) optical filter of the last stage (95-6) is connected with the add port (93) by one of the outputs (c);
   in the second multi-stage structure (90b) optical filter (95-6) of the last stage is connected with the add port (94) by the other input; and
   said optical combiner (96) is connected with the output port (92) by the output.

4. The controllable optical add/drop multiplexer of claim 1, wherein optical filters (95-1,95-2) of the first multi-stage structure (90a) are multi-stage nonsymmetrical Mach-Zehnder interferometers (60), and optical filters (95-3, . . . , 95-6) of the second multi-stage structure (90b) are single-stage nonsymmetrical Mach-Zehnder interferometers (20) and/or two-stage nonsymmetrical Mach-Zehnder interferometers (40).

5. The controllable add/drop multiplexer of claim 1, wherein said optical filters ({75-i}, {85-i}, {95-i}) contains electro-optical or thermo-optical phase shift devices (25; 47, 48) for controllable tuning the transmission of said optical filters.

6. The controllable add/drop multiplexer of claim 1, wherein it is produced according to integrated optic technique in the form of monolithic solid-state device.

7. The controllable add/drop multiplexer of claim 1, wherein the input port (91), the output port (92), the drop port (93) and the port (94) are produced in form of optical fibers.

* * * * *